(12) United States Patent
Chen et al.

(10) Patent No.: US 6,856,521 B1
(45) Date of Patent: Feb. 15, 2005

(54) PULSE WIDTH MODULATION SOFT-SWITCHING CONTROL

(75) Inventors: Keming A. Chen, Torrance, CA (US); James F. Lazar, Moorpark, CA (US); Lateef A. Kajouke, San Pedro, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/643,732

(22) Filed: Aug. 19, 2003

(51) Int. Cl.[7] .............. H02M 3/335; H02M 7/44; H02M 3/24
(52) U.S. Cl. .............. 363/17; 363/98; 363/132
(58) Field of Search .............. 363/17, 56.02, 363/98, 132

(56) References Cited

U.S. PATENT DOCUMENTS

| | | | | |
|---|---|---|---|---|
| 4,953,068 A | * | 8/1990 | Henze | 363/17 |
| 5,132,889 A | * | 7/1992 | Hitchcock et al. | 363/17 |
| 5,231,563 A | * | 7/1993 | Jitaru | 363/98 |
| 5,418,703 A | * | 5/1995 | Hitchcock et al. | 363/17 |
| 5,442,540 A | * | 8/1995 | Hua et al. | 363/98 |
| 5,563,775 A | * | 10/1996 | Kammiller | 363/17 |
| 5,877,947 A | * | 3/1999 | Chen et al. | 363/53 |
| 5,946,200 A | * | 8/1999 | Kim et al. | 363/17 |
| 5,956,238 A | * | 9/1999 | Wunderlich | 363/17 |
| 6,483,724 B1 | * | 11/2002 | Blair et al. | 363/17 |
| 6,560,127 B2 | * | 5/2003 | Wittenbreder, Jr. | 363/17 |
| 6,563,719 B1 | * | 5/2003 | Hua et al. | 363/21.06 |
| 6,650,551 B1 | * | 11/2003 | Melgarejo | 363/16 |

* cited by examiner

Primary Examiner—Bao Q. Vu
(74) Attorney, Agent, or Firm—Christopher DeVries

(57) ABSTRACT

A DC/DC converter includes a first leg and a second leg. A controller employs hard switching in the first leg to reduce the conduction loss. The controller employs zero voltage in the second leg to reduce the switching loss.

20 Claims, 2 Drawing Sheets

US 6,856,521 B1

PULSE WIDTH MODULATION SOFT-SWITCHING CONTROL

FIELD OF INVENTION

The invention relates generally to DC/DC converters, and more specifically relates to reducing conduction and switching losses in DC/DC converters.

BACKGROUND OF THE INVENTION

DC/DC converters produce an output voltage at a different voltage level than an input voltage to the DC/DC converter. For example, DC/DC converters are commonly used to increase a DC input voltage to a higher output voltage or to decrease a DC input voltage to a lower output voltage. In addition, DC/DC converters provide electrical isolation and power bus regulation. DC/DC converters are employed in a variety of applications, including power supplies for personal computers, office equipment, spacecraft power systems, laptop computers, telecommunications equipment, and DC motor drives.

The input to a DC/DC converter is typically an unregulated DC voltage. The DC/DC converter produces a regulated output voltage that has a magnitude and/or a polarity that differs from the input voltage. Typical DC/DC converters employ switching devices, such as MOSFETs, IGBTs, BJTs and thyristors, to regulate and convert the input voltage. A controller controls the switching frequency and sequence of the switching devices to produce a desired output voltage. For example, the controller may implement a pulse width modulation (PWM) approach to vary the duty cycle of switching devices. With PWM, the switching frequency is constant and the duty cycle varies with load and voltage requirements.

DC/DC converters typically include a transformer that isolates the converter input and output. The transformer reduces the stress on the switching devices and improves the efficiency of the switching devices. Conventional PWM converters turn off the switching devices when current is flowing through them, which is commonly referred to as hard switching. When hard switching is used at high frequencies, relatively high switching losses occur. Switching losses are especially pronounced in high power, high voltage applications where hard switching is utilized.

To reduce switching losses, DC/DC converters implement either zero-current switching (ZCS) or zero-voltage switching (ZVS), which are commonly referred to as soft switching. In devices using ZCS, the switching devices are turned off when there is zero current flowing through the switching devices. In devices using ZVS, the switching devices are turned on when there is no voltage across the switching devices. Neither of these two distinct approaches strike an optimum balance between switching and conduction losses.

BRIEF SUMMARY OF THE INVENTION

A DC/DC converter converts an input voltage to an output voltage and includes a transformer having a primary side and a secondary side. A primary side bridge rectifier communicates with the primary side and includes a first leg that is connected across the input voltage. The first leg includes a first switching circuit and a second switching circuit. A second leg is connected across the input voltage and includes a third switching circuit and a fourth switching circuit. A controller employs zero voltage switching (ZVS) to control the third and fourth switching devices and hard switching to control the first and second switching devices.

In other features, the controller turns off the fourth switching device with the ZVS, turns the third switching circuit on with the ZVS and turns the first switching circuit off with hard switching during a first half cycle.

In yet other features, the controller turns the second switching circuit on with hard switching, turns the third switching circuit off with the ZVS, turns the fourth switching circuit on with the ZVS and turns the second switching circuit off with hard switching during a second half cycle.

In still other features, the first switching circuit includes a first transistor having a first gate and a first diode that is connected antiparallel to the transistor. The second switching circuit includes a second transistor having a second gate and a second diode that is connected antiparallel to the transistor. The third switching circuit includes a third transistor having a third gate and a third diode that is connected antiparallel to the transistor and a first capacitor that is connected in parallel with the third diode. The fourth switching circuit includes a fourth transistor having a fourth gate and a fourth diode that is connected antiparallel to the transistor and a second capacitor that is connected in parallel with the diode.

In still other features, when the fourth switching device turns off during the first half cycle, the second capacitor is charged and the first capacitor is discharged. The third switching device is turned on after the first capacitor discharges. The first switching device is turned off when the third switching device is turned on. The third switching device is turned off after the second switching device is turned on during the second half cycle. The first capacitor charges and the second capacitor discharges when the third switching device is turned off. The fourth switching device is turned on when the second capacitor is discharged.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and accompanying drawings, wherein.

DETAILED DESCRIPTION OF THE INVENTION

Figure 1:
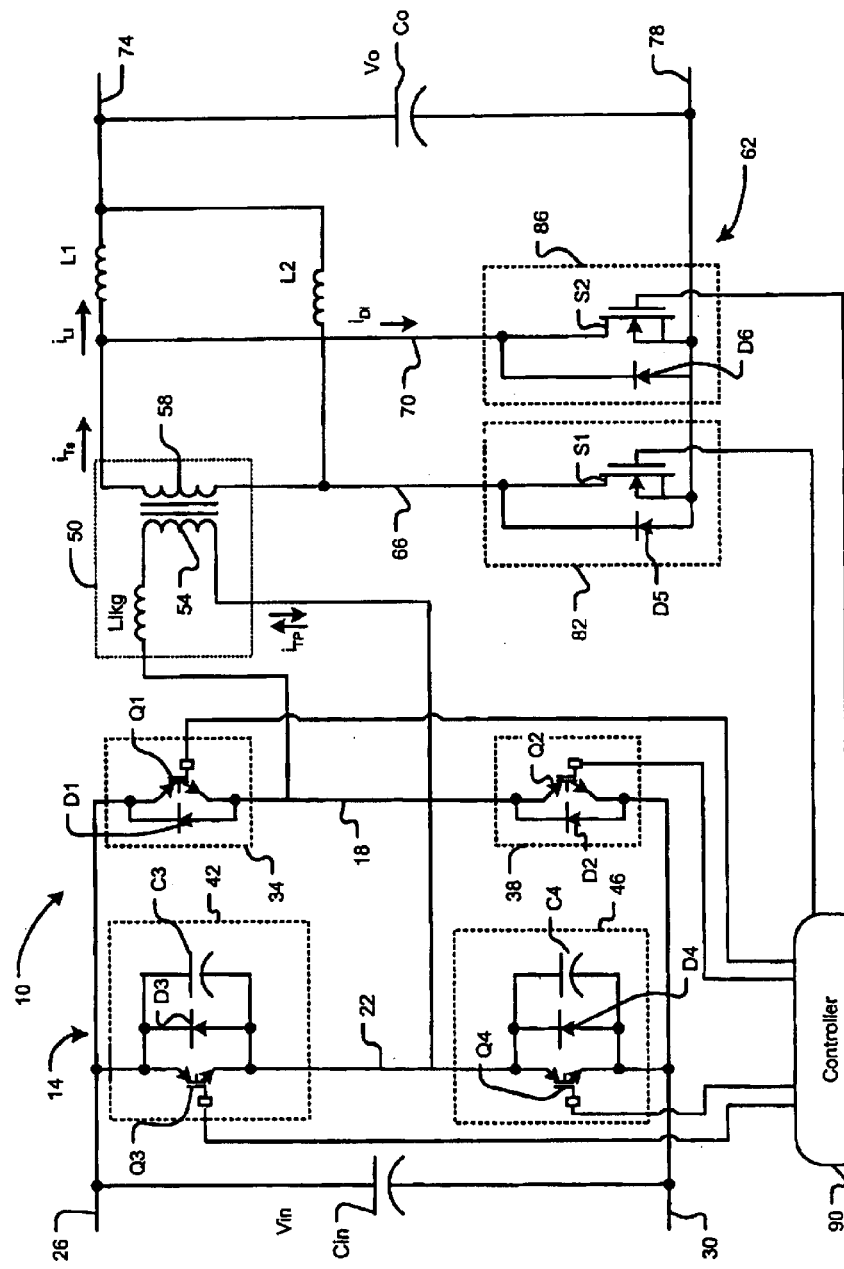
FIG. 1 is a simplified schematic of a DC/DC converter including a controller that employs a combination of ZVS and hard switching to reduce the combined switching and conduction losses according to the present invention.

The following description of the preferred embodiment(s) is merely exemplary in nature and is in no way intended to limit the invention, its application, or uses. For purposes of clarity, the same reference numbers will be used in the drawings to identify similar elements.

The DC/DC converter according to the present invention selectively employs both hard switching and ZVS to selectively reduce conduction and switching losses. FIG. 1 is a simplified schematic of a DC/DC converter 10 that operates with significantly reduced switching and conduction losses. The converter 10 includes a primary side bridge 14 with a first leg 18 and a second leg 22 that are connected between a first bus line 26 and a second bus line 30. The first leg 18 includes a first switching circuit 34 connected in series with a second switching circuit 38. The second leg 22 includes a third switching circuit 42 connected in series with a fourth switching circuit 46.

The first switching circuit 34 includes a first switching device Q1 connected in parallel with a first diode D1. The second switching circuit 38 includes a second switching device Q2 connected in parallel with a second diode D2. The third switching circuit 42 includes a third switching device Q3 connected in parallel with a third diode D3 and a first capacitor C3. The fourth switching circuit 46 includes a fourth switching device Q4 connected in parallel with a fourth diode D4 and a second capacitor C4.

The switching devices Q1, Q2, Q3 and Q4 can be any switching device suitable for high frequency, high power electrical switching. For example, the switching devices Q1, Q2, Q3 and Q4 can be a metal oxide semiconductor field effect transistor (MOSFET), an insulated gate bipolar transistor (IGBT), a bipolar junction transistor (BJT), or other suitable transistors. For convenience, switching devices Q1, Q2, Q3 and Q4 will be referred to herein merely as switches.

The converter 10 further includes a transformer 50 having a primary coil 54, a secondary coil 58, and a leakage inductor $L_{lkg}$. The opposite end of the primary coil 54 is connected to the second leg 22 between the third switching circuit 42 and the fourth switching circuit 46. The primary side bridge 14 also includes a first filter capacitor Cin connected between the first and second bus lines 26 and 30. The primary side bridge is connected to a DC power source, such as a battery, that provides a DC input voltage Vin.

The converter 10 further includes a secondary side bridge rectifier 62 that includes a third leg 66 and a fourth leg 70 connected between a third bus line 74 and a fourth bus line 78. The third leg 66 includes the secondary coil 58 of the transformer 50 connected in series with a fifth switching circuit 82 which includes a fifth switching device S1 connected in parallel with a fifth diode D5. The fourth leg 70 includes a sixth switching circuit 86 that includes a sixth switching device S2 connected in parallel with a sixth diode D6. The rectifier 62 further includes a second filter capacitor Co connected between the third and fourth bus lines 74 and 78. The third bus line 74 includes a first inductor L1 connected between the fourth leg 70 and the second filter capacitor Co. A second inductor L2 is connected in parallel with the first inductor L1 and the secondary coil 58 of the transformer 50.

A controller 90 is connected to the switches Q1, Q2, Q3, Q4, S1 and S2 and controls the operation of the switches Q1, Q2, Q3, Q4, S1 and S2. The controller 90 can be any control device suitable for controlling the operation of the switches Q1, Q2, Q3, Q4, S1 and S2. For example a microprocessor, a programmable logic controller (PLC) an Application Specific Integrated Circuit (ASIC), a circuit, or any other device may be used. The controller 90 utilizes pulse width modulation (PWM) to sequentially transition the switches Q1, Q2, Q3, Q4, S1 and S2 between an On position and an Off position.

More specifically, the controller 90 implements a desired duty cycle to control the transitioning of the switches Q1–Q4 to chop a current signal created by Vin. The chopped current flows through the primary coil 54 in accordance with the duty cycle, thereby creating an electromagnetic field in the transformer 50. The electromagnetic field generates current through the secondary coil 58. The current is rectified by an appropriate switching sequence of the switches S1 and S2. The switching sequence is controlled by the controller 90.

The rectified current provides the voltage Vo, having a desired voltage level, to a load (not shown) connected across the third and fourth bus lines 74 and 78. The duty cycle implemented by the controller 90 transitions the switches Q1–Q4 between the On and Off positions in a sequence that operates the converter 10 with significantly reduced switching and conduction losses with respect to the switching and conduction losses of known DC/DC converters.

Figure 2:
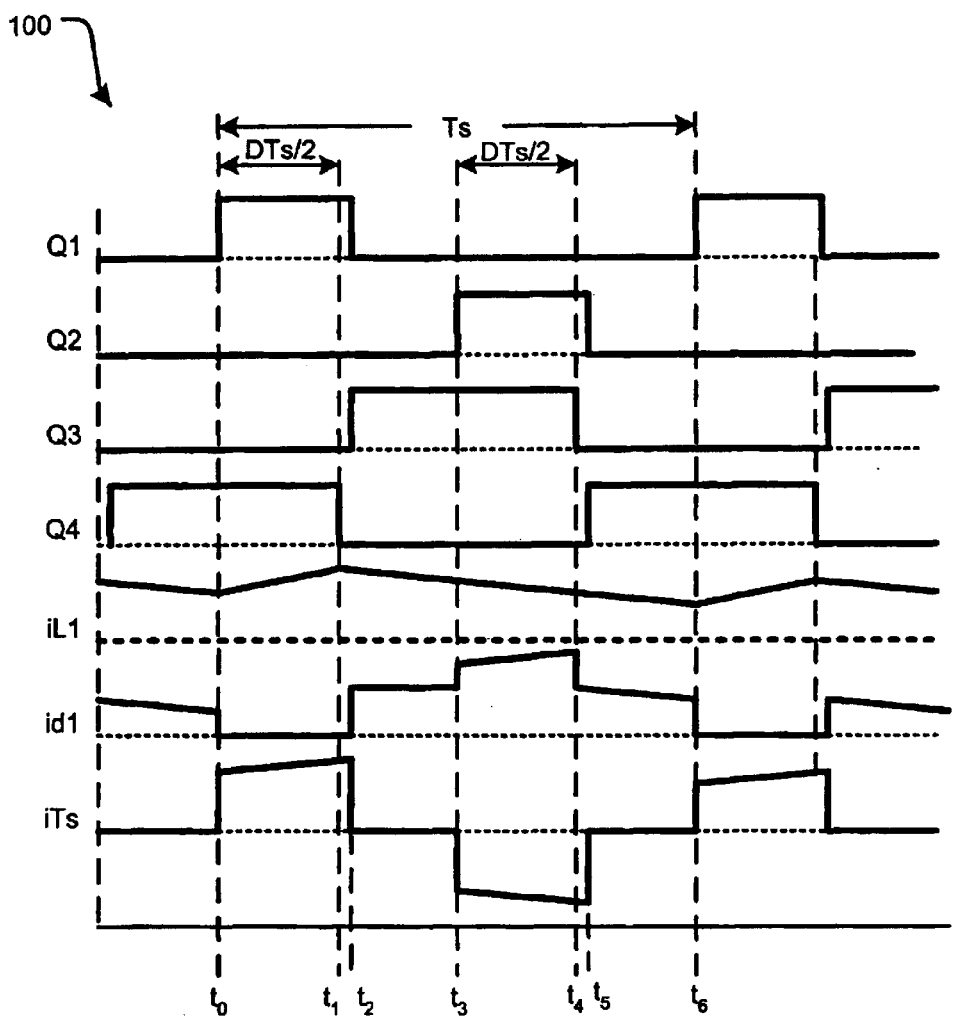
FIG. 2 illustrates control signals used by a controller to control switching devices according to the present invention.

FIG. 2 is a state diagram 100 illustrating the control signals used by the controller 90 to control the switches Q1, Q2, Q3 and Q4 during one duty cycle Ts. The state diagram 100 also illustrates current patterns of a current $i_{L1}$ flowing through the first inductor L1, a current $i_{d1}$ flowing through the switch S2, and a current $i_{TS}$ flowing through the secondary coil 58 of the transformer 50 during the duty cycle Ts.

During a first half cycle, the switching sequence proceeds as follows: Switch Q4 turns off at $t_1$ (soft switching). Capacitor $C_4$ is charged to $V_{in}$ and capacitor $C_3$ discharges to 0. Switch Q3 can turn on with zero voltage switching. Switch Q1 is turned off immediately, which is a hard switching of switch Q1. While there is some switching loss, there is a substantial savings overall due to reduced conduction loss.

The next half cycle proceeds as follows: At $t_3$, switch $Q_2$ is turned on, which is a hard turn on. Switch $Q_3$ is still on from the previous half cycle. Switch $Q_3$ can be turned off with zero voltage soft switching. Capacitor $C_3$ charges and capacitor $C_4$ discharges. When capacitor $C_4$ reaches 0 volts, switch $Q_4$ is turned on with zero voltage switching. Switch $Q_2$ is then turned off; which is a hard switching transition.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A DC/DC converter that converts an input voltage to an output voltage and includes a transformer having a primary side and a secondary side, comprising:

a primary side bridge rectifier that communicates with the primary side and includes a first leg that is connected across said input voltage and includes a first switching circuit and a second switching circuit, and a second leg that is connected across said input voltage and that includes a third switching circuit and a fourth switching circuit;

a switch controller that employs zero voltage switching (ZVS) to control said third and fourth switching devices and hard switching to control said first and second switching devices.

2. The DC/DC converter of claim 1 wherein said switch controller turns off said fourth switching device with ZVS, turns said third switching circuit on with ZVS and turns said first switching circuit off with hard switching during a first half cycle.

3. The DC/DC converter of claim 1 wherein said controller turns said second switching circuit on with hard switching, turns said third switching circuit off with ZVS, turns said fourth switching circuit on with ZVS and turns said second switching circuit off with hard switching during a second half cycle.

4. The DC/DC converter of claim 1 wherein said controller turns off said fourth switching device with ZVS, turns said third switching circuit on with ZVS and turns said first switching circuit off with hard switching during a first half cycle and wherein said controller turns said second switching circuit on with hard switching, turns said third switching circuit off with ZVS, turns said fourth switching circuit on with ZVS and turns second switching circuit on with hard switching during a second half cycle.

5. The DC/DC converter of claim 4 wherein said first switching circuit includes a first transistor having a first gate and a first diode that is connected antiparallel to said transistor.

6. The DC/DC converter of claim 5 wherein said second switching circuit includes a second transistor having a second gate and a second diode that is connected antiparallel to said transistor.

7. The DC/DC converter of claim 6 wherein said third switching circuit includes a third transistor having a third gate and a third diode that is connected antiparallel to said transistor and a first capacitor that is connected in parallel with said third diode.

8. The DC/DC converter of claim 7 wherein said fourth switching circuit includes a fourth transistor having a fourth gate and a fourth diode that is connected antiparallel to said transistor and a second capacitor that is connected in parallel with said diode.

9. The DC/DC converter of claim 8 wherein when said fourth switching device turns off during said first halt cycle, said second capacitor is charged and said first capacitor is discharged.

10. The DC/DC converter of claim 9 wherein said third switching device is turned on after said first capacitor discharges.

11. The DC/DC converter of claim 10 wherein said first switching device is turned off when said third switching device is turned on.

12. The DC/DC converter of claim 8 wherein said third switching device is turned off after said second switching device is turned on during said second half cycle.

13. The DC/DC converter of claim 8 wherein said first capacitor charges and said second capacitor discharges when said third switching device is turned off.

14. The DC/DC converter of claim 13 wherein said fourth switching device is turned on when said second capacitor is discharged.

15. A method for operating a DC/DC converter including a primary side bridge rectifier with a first leg that is connected across said input voltage and includes a first switching circuit and a second switching circuit, and a second leg that is connected across said input voltage and that includes a third switching circuit and a fourth switching circuit, comprising:

during an first half cycle:
    turning on said first switching circuit on with hard switching;
    turning off said fourth switching device with zero voltage switching (ZVS);
    turning said third switching circuit on with said ZVS; and
    turning said first switching circuit off with hard switching.

16. The method of claim 15 further comprising:

during a second half cycle:
    turning said second switching circuit on with hard switching;
    turning said third switching circuit off with said ZVS;
    turning said fourth switching circuit on with said ZVS; and turning said second switching circuit off with hard switching.

17. A DC/DC converter comprising:

a first leg;

a second leg; and a controller that employs hard switching in the first leg to reduce conduction loss and zero voltage in the second leg to reduce switching loss.

18. The DC/DC converter of claim 17 further comprising a transformer that communicates with said first and second legs and that includes a primary side and a secondary side.

19. The DC/DC converter of claim 17 further comprising an input voltage source, wherein said first leg is connected across said input voltage source and includes a first switching circuit and a second switching circuit.

20. The DC/DC converter of claim 19 wherein said second leg is connected across said input voltage and includes a third switching circuit and a fourth switching circuit, wherein said controller employs zero voltage switching (ZVS) to control said third and fourth switching devices and hard switching to control said first and second switching devices.

* * * * *